UNITED STATES PATENT OFFICE.

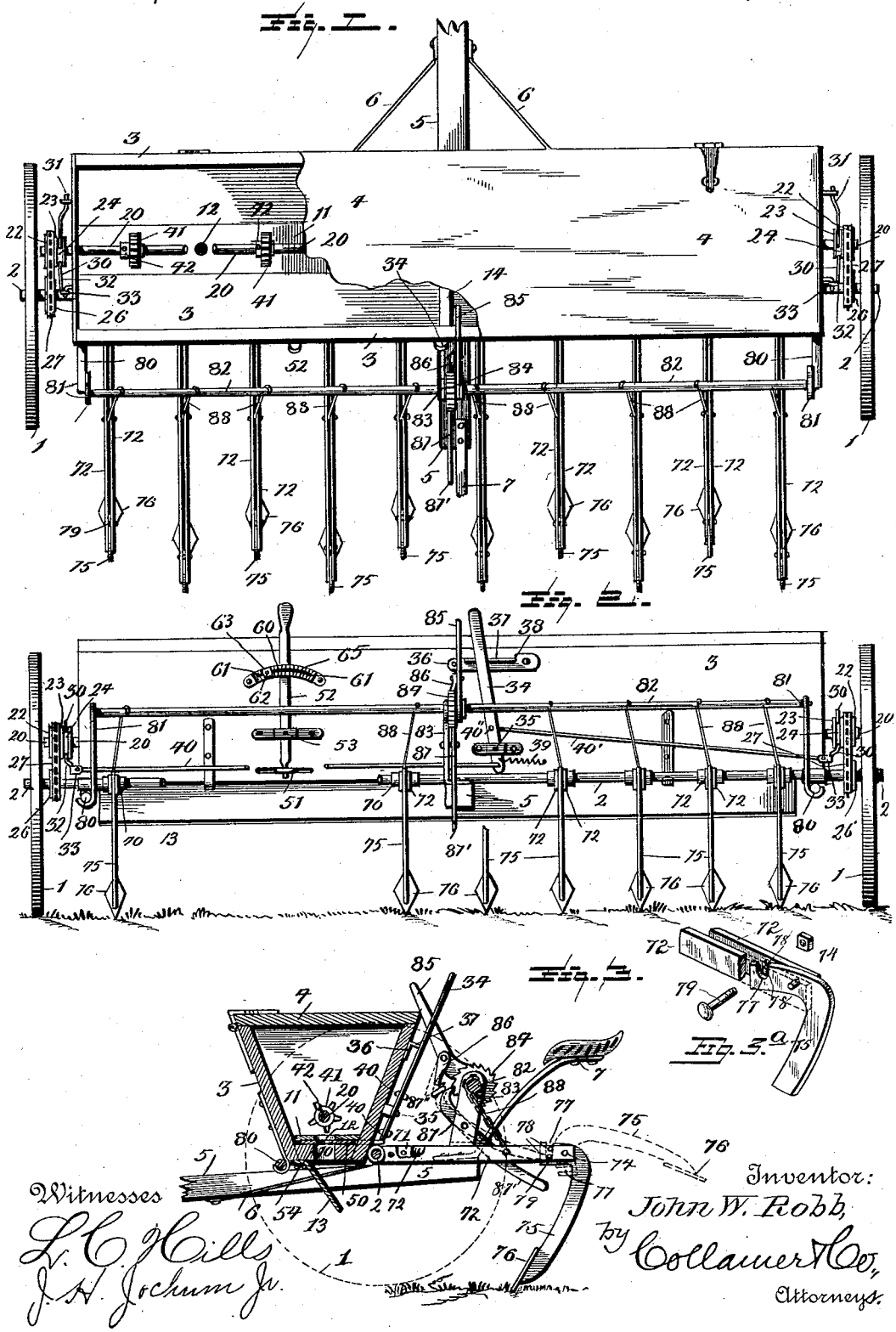

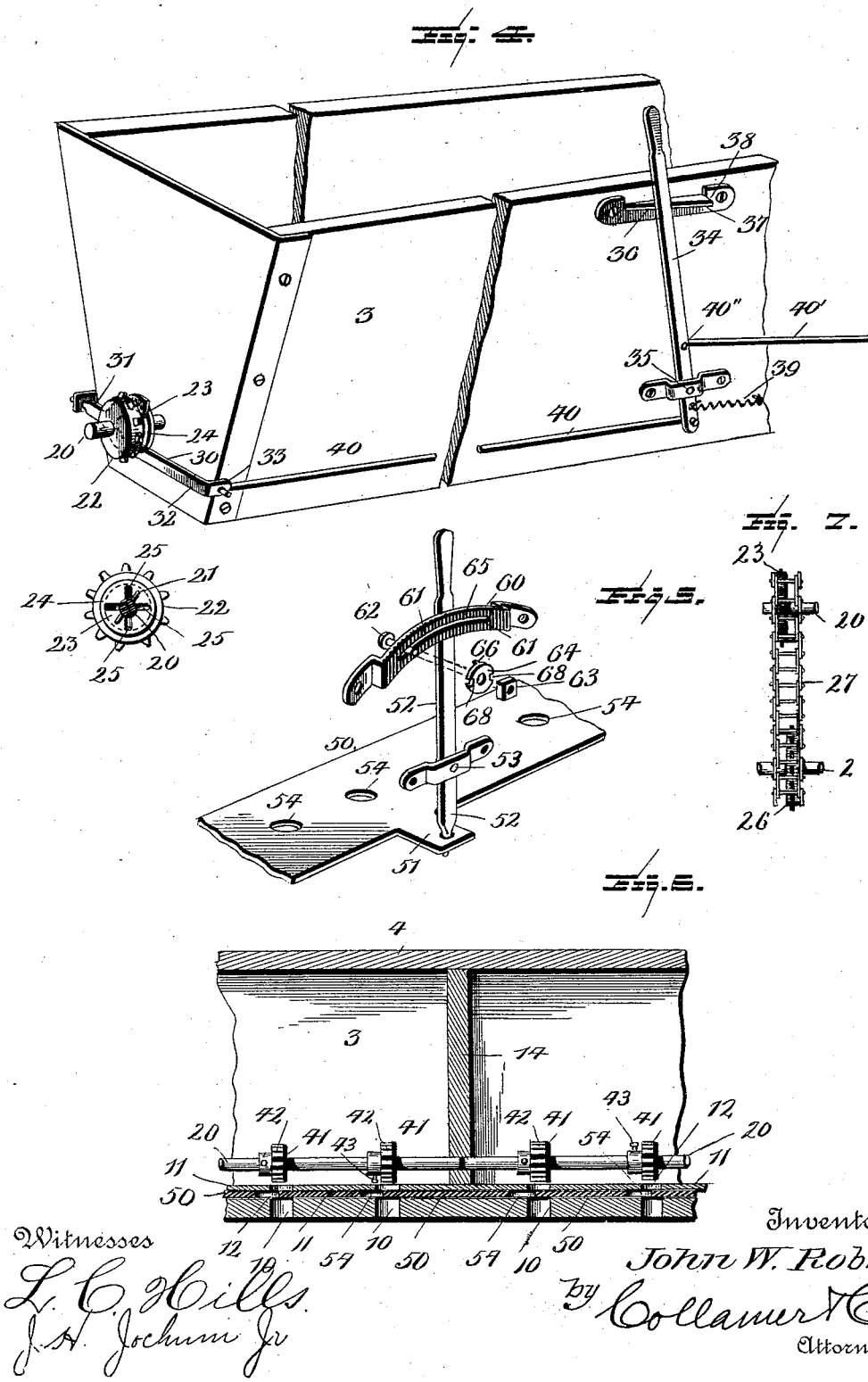

JOHN W. ROBB, OF DE WITT, IOWA.

SEED-PLANTER.

SPECIFICATION forming part of Letters Patent No. 489,268, dated January 3, 1893.

Application filed August 22, 1892. Serial No. 443,809. (No model.)

*To all whom it may concern:*

Be it known that I, JOHN W. ROBB, a citizen of the United States, residing at De Witt, in the county of Clinton and State of Iowa, have invented certain new and useful Improvements in Seed-Planters; and I do hereby declare the following to be a full, clear, and exact description of the invention, such as will enable others skilled in the art to which it appertains to make and use the same.

This invention relates to seed planters, and more especially to that class thereof employing rotating agitators: and the object of the same is to effect certain improvements in machines of this character.

To this end the invention consists in the specific details of construction hereinafter more fully described and claimed, and as illustrated on the accompanying two sheets of drawings, wherein—

Figure 1 is a plan view of the improved seed planter with one end of the cover to the seed box broken away to show its interior construction. Fig. 2 is a rear elevation with certain parts omitted. Fig. 3 is a central cross section showing how the pawls for the cultivator raising mechanism are simultaneously tripped, and also showing how the cultivator teeth may be deflected rearwardly. Fig. 3ª is a perspective detail, partly in section, showing the friction clamp for one of the cultivator teeth. Fig. 4 is a perspective detail of the lever for operating the clutches—one of the latter being also shown. Fig. 5 is a perspective detail of the feed-gage lever, its parts being slightly separated. Fig. 6 is a central longitudinal section of a portion of the hopper or seed box with its contained mechanism. Fig. 7 is a plan view showing the two sprocket wheels and the wide sprocket chain connecting them.

*The framework and hopper.*—1 1 are supporting wheels which are journaled loosely on the ends of an axle 2 extending across this machine and properly secured beneath the rear corner of a hopper or seed-box 3 having a hinged cover 4. 5 is the tongue which extends beneath the hopper and axle and is braced by rods 6, and this tongue may carry a seat 7 at its rear end if desired. The horses are hitched to the front end of the tongue as usual. The hopper is provided in its bottom with a longitudinal series of holes 10, and just above said bottom is a false bottom 11 having a corresponding and registering series of holes 12. To the bottom of the hopper is secured a deflector 13 inclining to the rear and adapted to deliver the seed in that direction; and across the center of the hopper is a partition 14 dividing the hopper into two half compartments. The cover may be whole as shown and locked closed in any suitable manner, or it may be in halves, each covering one half thereof and locked in a similar manner.

*The agitator and connections* —There are two shafts 20, each journaled at its inner end in the partition 14 and at its outer end passing through and journaled in the end of the hopper and having a transverse pin 21 through it. 22 is a sprocket wheel having an inwardly-projecting hub 23 provided with an annular groove 24. This wheel is journaled loosely on the outer end of its shaft 20, and the inner end of said hub has a pair of notches 25 adapted to engage said pin when moved inwardly. On the inner end of the hub of the supporting wheel 1 is another sprocket wheel 26 connected by a wide chain belt 27 with the sprocket wheel 22—the belt being wide so as to permit the movement of the wheel 22 without binding of parts. 30 is a yoke secured at its front end at 31 to the end of the hopper, its body spanning the hub 23 and resting in the groove 24 therein, and its inner end 32 projecting to the rear of the hopper and having an eye 33. 34 is the shifting lever for moving the agitator into or out of connection with the supporting wheels 1. This lever is pivoted at 35 to the rear face of the hopper, and its upper end moves against a catch 36 which has an inclined lip 37 with a flat face 38 standing at its right end: while a spring 39 draws the lever in the opposite direction, so that the function of the catch becomes to hold the lever against the force of the spring. The lower end of the lever is connected by a rod 40 with the eye 33 of the yoke at the left end of the machine, while the right yoke is similarly connected by a rod 40' with the lever just above its pivot 35 at the point 40''. In its normal position the lever stands to the left so that both yokes are drawn inward, and their sprocket wheels engage pins through the shafts, and the agitators are moving. When desired to stop this movement, the driver—who is within easy reach of this lever—moves it to the right. It then travels up the inclined lip 37 and falls over and rests against the flat face 38 where it is held. This movement has pushed out on the two rods and moved the sprocket wheels so that their notches 25 disengage the pins 21; and thereafter the rotation of the supporting wheels 11 will not turn the shafts and move the agitators. The latter consists of small wheels 41 having wings 42 projecting radially from their hubs, and through the latter are passed set screws 43 whereby they may be set on the shafts 20 just over the holes in the false bottom. Of course, when these agitators rotate, they cause the seeds to pass down through said holes.

*The seed-gage.*—50 is a plate moving longitudinally between the true and false bottoms of the hopper, and this plate has a lip 51 projecting through the rear wall of the hopper. 52 is a lever pivoted at 53 to this rear wall, and at its lower end engaging said lip, so that when the upper end of the lever is moved to the right, the plate will be moved to the left. The latter has a series of holes 54 adapted to register exactly with those in the false bottom, but when thrown slightly out of alignment therewith, it will be obvious that the feed of the seeds from the hopper will be to an extent retarded and hence gaged as desired. 60 is a curved strap secured at its ends to the hopper and provided with a longitudinal slot 61 in its body, and the lever 52 moves between this strap and the hopper. In said slot stands a bolt 62 whose head rests against the front face of the strap, whose body passes through said slot, and whose nut 63 bears a washer 64 against the rear face of the strap. Said rear face has a number of transverse notches 65, into any one of which teeth 66 on the washer under the nut may be pressed, by screwing said nut home. The washer is also provided with side notches 68 standing over the slot in the strap. By setting this bolt with the teeth in the proper notch the throw of the lever until it strikes the bolt may be regulated. It will be understood that the lever stands in such position that the gage normally closes or shuts off the feed, but when brought against said bolt the gage is opened for that distance indicated by the notch to which the bolt is set. When it is desired to temporarily stop the feed, it may be done, and the lever returned to position afterward.

*The cultivator.*—70 is an eye journaled on the axle, and 71 is a tongue projecting from this eye. 72 is a pair of bars bolted to this tongue, extending to the rear, and connected at their rear ends by a bolt 74 on which is pivoted a tooth 75. The latter 75 is approximately of L shape, the pivot passing through its angle; its longer arm depends and carries a blade 76, and its shorter arm passes forward between the bars 72 and is notched as at 77. See Fig. 3ª. 78 is a number of holes through the bars at a proper point to receive a clamping or tightening bolt 79, up against which the bottom of the notch 77 rests to hold the tooth in position. When an obstruction is struck by the blade 76, it will be obvious that the tooth may deflect as seen in dotted lines, so that the parts will not become broken: also, by setting the bolt 79, the angle of the tooth may be adjusted as desired. I preferably arrange a number of these cultivator teeth, alternating in length as seen in Fig. 1, and if preferred the blades may be set obliquely to give them the proper angle to the direction of movement. These blades turn in the seeds after they are dropped, and render it unnecessary to follow the planter with another machine to complete the work.

*The elevator.*—80 is a bar clamped in any suitable manner under each end of the hopper and axle projecting to the rear and turned up (or carrying arms which are turned up) as at 81, between which is journaled a rod 82. 83 is a standard rising from the tongue just in front of the seat (if used), and the rod 82 is journaled also through the upper end of this standard to strengthen its center. Adjacent the standard a ratchet wheel 84 is keyed on the rod, and adjacent that a lever 85 is mounted loosely on the rod, and carries a pivoted pawl 86 adapted to pass over the wheel, engage its teeth, and turn it to the rear as the lever is depressed. A retaining pawl 87 is pivoted to the standard under the wheel with its rear end 87' extended to the rear so as to form a handle and so as to cause its free end or operative tip 87" to automatically engage the teeth at the front side of the wheel. This tip is beveled as shown in Fig. 3, so that when the handle 87' is raised, the tip not only disengages the teeth, but also causes the pawl 86 to do so. Chains 88 are connected to the rod 82, depend, and are fastened to the bars 72, so that when the rod is turned by the lever 85 the chains will wind thereon to raise the teeth as desired.

All parts are of the desired sizes, shapes, and materials to perform the work required of them; and of course I do not limit myself thereto. Neither do I lay stress on the exact construction, as considerable change may be made therein without departing from the spirit of my invention.

The horses being hitched to the tongue and the hopper filled with seed, the driver follows the machine (or sits in the seat if used) and drives the team. The bolt is set in the slot to permit the lever to open the gage just sufficient to cause the hopper to feed as fast as desired, and when the point of feeding is reached the lever is thrown against its stop and the feed commences. With very fine seed this may be sufficient, but clogging will be readily overcome by starting the agitator. This is done by moving the other lever to the right and engaging it behind the face of the incline, and at this time both sprocket wheels are engaged with the pins through the shafts and the latter revolve with the motion of the supporting wheels. In turning corners or whenever it is desired to stop the motion of the agitator, the lever is disengaged and thrown to the left; and if it is desired to move one clutch without the other, the rod 40 or 40' may be disconnected with the eye 33 and the spring of the yoke will hold it thus. To cause the cultivator to work, the trip-lever or handle is raised and its free end or tip disengages the ratchet wheel and also causes the pawl to disengage it, when the weight of the teeth will cause them to descend. The handle is then released, and to raise the teeth again the lever carrying the pawl is reciprocated a few times. When the cultivator is in use and one of the blades strikes a stone or other obstruction, its tooth turns on its pivot bolt as seen in Fig. 3 drawing the notch therein forcibly out of the clamping action by which it is held between the bars. From time to time the hopper-cover is raised and the hopper filled with the seed desired.

Without limiting myself to the precise construction, what I claim as new is—

1. In a seed planter, a hopper having feed-openings, shafts journaled through said hopper and carrying agitators, sprocket wheels loosely mounted on said shafts, clutches between the shafts and sprocket wheels, a lever pivoted to the hopper, rods connecting said lever with the clutch-operating devices, a spring throwing the lever in position to normally engage the clutch-members, and a catch for the lever having an inclined lip with a flat face, the latter holding the lever against the tension of the spring; in combination with a main axle carrying supporting wheels, sprocket wheels on said axle, and wide sprocket chains connecting the sprocket wheels on the axle with those on the shafts, as and for the purpose set forth.

2. In a seed planter, a hopper having feed-openings in its bottom, shafts journaled through said hopper and carrying agitators, sprocket wheels mounted loosely on the ends of said shafts, clutches between the shafts and sprocket wheels, means for holding the clutch-members normally in engagement, and a lever for disengaging them at will; in combination with a main axle carrying supporting wheels and by which the hopper is sustained, sprocket wheels on said axle, and wide sprocket chains connecting the sprocket wheels on the axle with those on the shafts, as and for the purpose set forth.

3. In a seed planter, the combination with a hopper having feed openings, an agitator shaft in said hopper and projecting through its end, a pin through this shaft, a sprocket wheel having a grooved hub provided with end notches to receive said pin, an axle carrying another sprocket wheel, and a chain belt connecting said sprocket wheels; of an inwardly-pressing spring yoke engaging said groove, its front end being secured to the hopper and its rear end having an eye, a lever connected with said eye, a spring throwing said lever in opposite direction, and a catch for the lever holding it against the tension of its spring, as and for the purpose set forth.

4. In a seed planter, the combination with a hopper, an agitator-shaft therein, a sprocket wheel on said shaft driven from the axle, and a clutch between said sprocket wheel and shaft; of a lever pivoted to the hopper, a rod connecting said lever with the clutch-operating devices, a spring throwing the lever in position to normally engage the clutch members, and a catch for the lever having an inclined lip with a flat face, the latter holding the lever against the tension of the spring, as and for the purpose set forth.

5. In a seed planter, the combination with a hopper having feed-openings, a gage plate also having openings, and a lever pivoted to the hopper and connected with said plate; of a curved strap secured at its ends to the hopper and behind which the lever moves, the strap having notches in its rear face and a longitudinal slot, a stop-bolt through said slot and against which the lever strikes, and a washer under the nut of the bolt and having teeth adapted to engage said notches, as and for the purpose set forth.

6. In a seed planter, the combination with a hopper supported on an axle, a tongue extending under the hopper, a bar clamped under the hopper and having upturned arms at its rear ends, and a standard on the rear end of the tongue; of a shaft journaled in said arms and standard, cultivator teeth pivotally connected with said axle, chains extending from the teeth to said shaft, and a pawl-and-ratchet mechanism on the latter for turning it, as and for the purpose set forth.

7. In a seed planter, the combination with the hopper mounted on an axle, a number of cultivator teeth pivotally connected with said axle, a rock-shaft, and a chain from each tooth attached to and passing around said shaft; of a ratchet wheel on said shaft, a lever pivoted on the shaft adjacent said wheel and having a pawl engaging the teeth thereof, and a retaining pawl pivoted to a standard below the wheel, its operative tip engaging the teeth thereof and releasing said other pawl therefrom when it is itself disengaged, as and for the purpose set forth.

In testimony whereof I affix my signature in presence of two witnesses.

JOHN W. ROBB.

Witnesses:
ADONIRAM J. CLARK,
RICHARD B. WOLFE.